(12) United States Patent
Baker

(10) Patent No.: US 11,831,223 B1
(45) Date of Patent: Nov. 28, 2023

(54) ELECTROMECHANICAL PROGRAMMABLE MOTOR CONTROLLER

(71) Applicant: Elliott Baker, Albany, NY (US)

(72) Inventor: Elliott Baker, Albany, NY (US)

( * ) Notice: Subject to any disclaimer, the term of this patent is extended or adjusted under 35 U.S.C. 154(b) by 0 days.

(21) Appl. No.: 18/170,793

(22) Filed: Feb. 17, 2023

(51) Int. Cl.
| H02P 7/03 | (2016.01) |
| H02K 7/14 | (2006.01) |
| H02P 7/06 | (2006.01) |
| H02K 7/116 | (2006.01) |

(52) U.S. Cl.
CPC .............. *H02K 7/14* (2013.01); *H02P 7/03* (2016.02); *H02P 7/06* (2013.01); *H02K 7/116* (2013.01)

(58) Field of Classification Search
CPC .. H02K 7/14; H02K 7/116; H02P 7/03; H02P 7/06
See application file for complete search history.

(56) References Cited

U.S. PATENT DOCUMENTS

| 4,699,027 | A | 10/1987 | Guyette et al. |
| 9,943,739 | B2 | 4/2018 | Hart |
| 10,433,135 | B2 | 10/2019 | Brochu et al. |
| 2010/0264670 | A1* | 10/2010 | Usami ................... F02N 11/087 310/68 B |
| 2014/0019392 | A1 | 1/2014 | Buibas |

FOREIGN PATENT DOCUMENTS

| CN | 104898665 A | 9/2015 |
| CN | 105307824 A | 2/2016 |
| CN | 108296577 A | 7/2018 |
| CN | 111189061 A | 5/2020 |
| CN | 111197738 A | 5/2020 |
| CN | 211625314 U | 10/2020 |
| EP | 0477933 A1 * | 4/1992 |
| JP | 2006159923 A | 6/2006 |
| JP | 2021080956 A * | 5/2021 |
| WO | 2013001616 A1 | 1/2013 |

OTHER PUBLICATIONS

Claude Ziad El-Bayeh, Manual Logic Controller (MLC), International Journal of Digital Information and Wireless Communications Jan. 2015.

* cited by examiner

*Primary Examiner* — Muhammad S Islam
*Assistant Examiner* — Bradley R Brown
(74) *Attorney, Agent, or Firm* — Stephen P. Scuderi; Heslin Rothenberg Farley & Mesiti PC

(57) ABSTRACT

A motor controller includes an actuator and a programmable wheel. The actuator includes first and second conductive rods configured to receive external electric power. Each rod has upper and lower rod contacts. First and second crisscrossed electrodes are movable between, and electrically connectible to, the upper and lower rod contacts. A power terminal is electrically connected to the crisscrossed electrodes. The programmable wheel has first and second directional appendages mounted thereon. The wheel is configured to engage the actuator such that for each revolution of the wheel: the first directional appendage moves the crisscrossed electrodes into electrical contact with the upper rod contacts to route the electric power to the power terminal at a first polarity, and the second directional appendage moves the crisscrossed electrodes into electrical contact with the lower rod contacts to route the electrical power to the power terminal at a second opposing polarity.

20 Claims, 13 Drawing Sheets

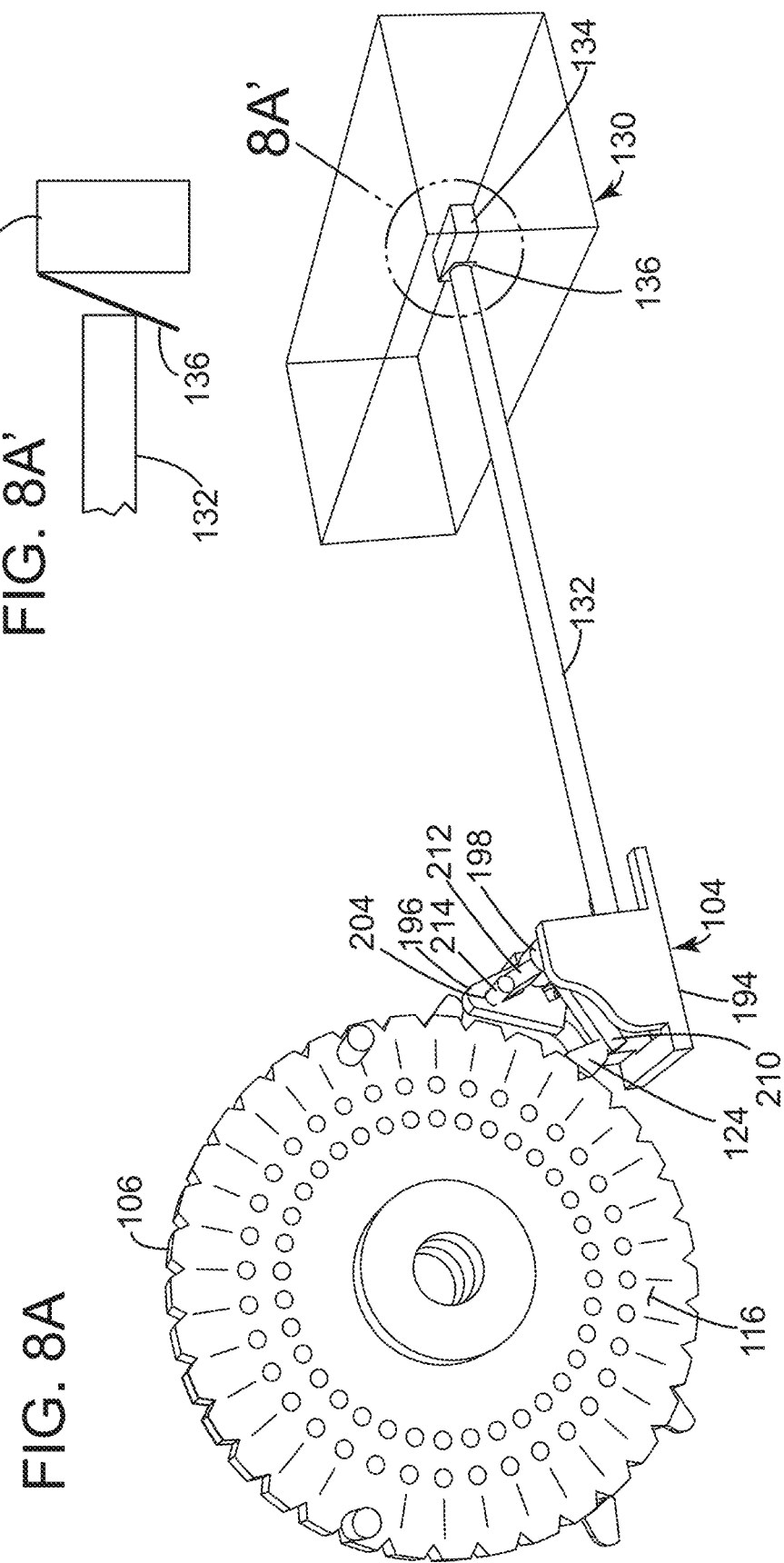

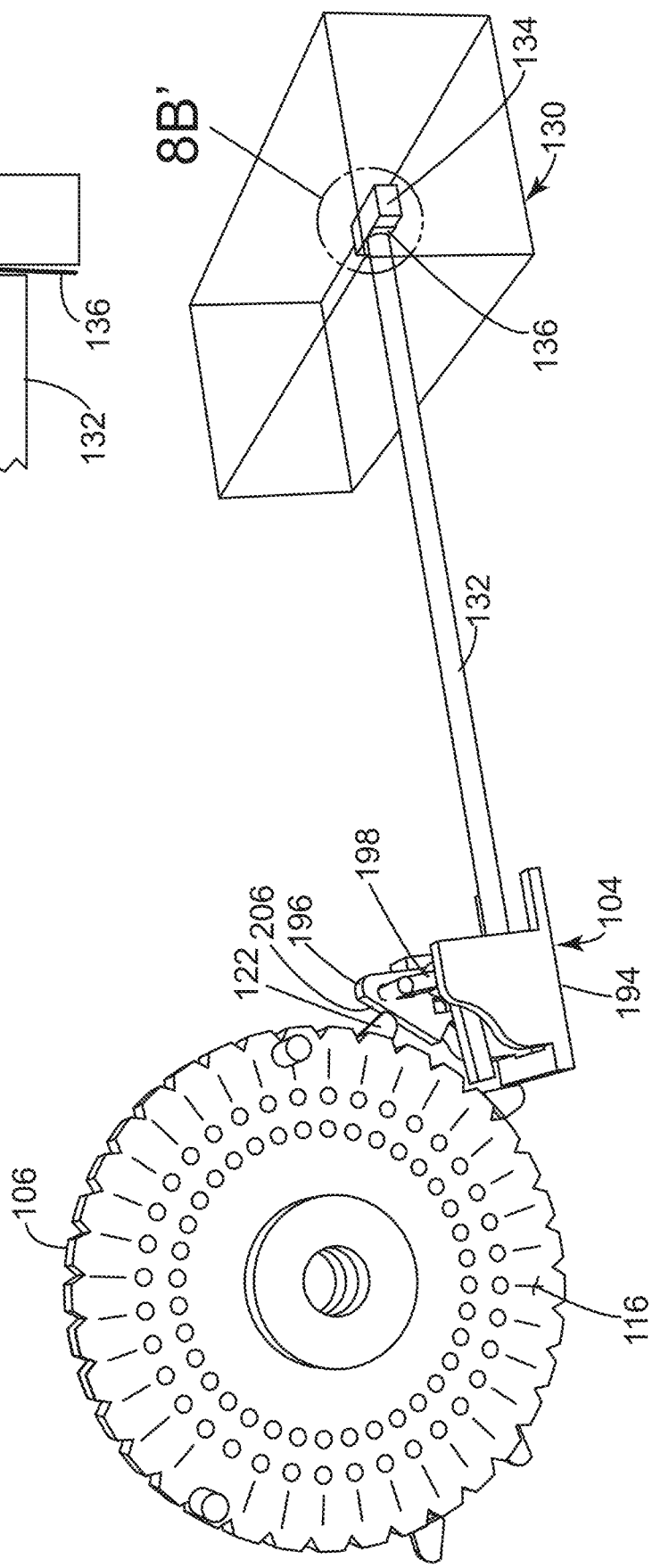

ELECTROMECHANICAL PROGRAMMABLE MOTOR CONTROLLER

TECHNICAL FIELD

The present disclosure relates to motor controllers. More specifically, the disclosure relates to electromechanical, programmable motor controllers.

BACKGROUND

A motor controller is a device or group of devices that can coordinate in a predetermined manner the performance of an electric motor. A motor controller might include a manual or automatic means for starting and stopping the motor, selecting forward or reverse rotation, selecting and regulating the speed, and various other parameters of the motor.

Programmable motor controllers often utilize microprocessors that include programmable software stored in a memory of the microprocessor or other computer device. The microprocessor may be programmed to read signals that are indicative of a motor's performance and to generate control signals that can change or control the performance of the motor. However, such microprocessors are almost always connected to the internet and are susceptible to being manipulated by outside bad actors, such as hackers or terrorists.

Accordingly, there is a need for a programmable motor controller system that does not require a software package to be programmed in order to control basic functioning parameters of a motor. Additionally, there is a need for a motor controller that can control basic parameters of a motor, such as rotation, start, stop and speed, via purely electromechanical devices or components.

BRIEF DESCRIPTION

The present disclosure offers advantages and alternatives over the prior art by providing a motor controller that can be programmed to control various basic parameters of a motor via purely electromechanical devices or components. The disclosure provides a motor controller that can be programmed to control such parameters as, speed, rotational direction, start and stop, but does not require a computer device or a memory to do so. Moreover, the motor controller provided does not interface with the internet and is, therefore, virtually impossible to hack into.

A motor controller in accordance with one or more aspects of the present disclosure includes an actuator and a programmable wheel. The actuator includes first and second conductive rods configured to receive external electric power from an external power source. Each rod has upper and lower rod contacts. First and second crisscrossed electrodes are movable between, and electrically connectible to, the upper and lower rod contacts. A power terminal is electrically connected to the crisscrossed electrodes. The programmable wheel is mounted on a motorized shaft. The wheel has first and second directional appendages mounted thereon. The wheel is configured to engage the actuator such that for each revolution of the wheel:

The first directional appendage moves the crisscrossed electrodes into electrical contact with the upper rod contacts to route the electric power to the power terminal at a first polarity. Wherein the electric power at the first polarity is operable to turn an electric motor electrically connected thereto in a first direction.

The second directional appendage moves the crisscrossed electrodes into electrical contact with the lower rod contacts to route the electrical power to the power terminal at a second opposing polarity. Wherein the electric power at the second polarity is operable to turn the electrically connected electric motor in a second opposite direction.

Another motor controller in accordance with one or more aspects of the present disclosure includes a programmable wheel, a speed control switch and a speed control mechanism. The programmable wheel is mounted on a motorized shaft. The wheel has first and second speed appendages mounted thereon. The speed control switch is electrically connected to an electric motor. The speed control switch includes a switching mechanism. The switching mechanism has a first switch position and a second switch position. When the switching mechanism is in the first switch position, the electric motor rotates at a first speed, and when the switching mechanism is in the second switch position, the electric motor rotates at a different second speed. The speed trigger mechanism includes a speed trigger rod that is configured to engage with the switching mechanism of the speed control switch. The speed trigger mechanism is configured to move the speed trigger rod between an extended position and a retracted position. For each revolution of the programmable wheel:

The first speed appendage engages the speed trigger mechanism to move the speed trigger rod into its extended position, thereby moving the switching mechanism of the speed control switch to its first switch position to operate the electric motor at the first speed.

The second speed appendage engages the speed trigger mechanism to move the speed trigger rod into its retracted position, thereby moving the switching mechanism of the speed control switch to its second switch position to operate the electric motor at the second speed.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

DRAWINGS

The disclosure will be more fully understood from the following detailed description taken in conjunction with the accompanying drawings, in which:

FIG. 8A depicts an example of a perspective view of the assembled speed trigger mechanism and its speed trigger rod of FIG. 6A in its retracted position, according to aspects described herein;

Figure 1:
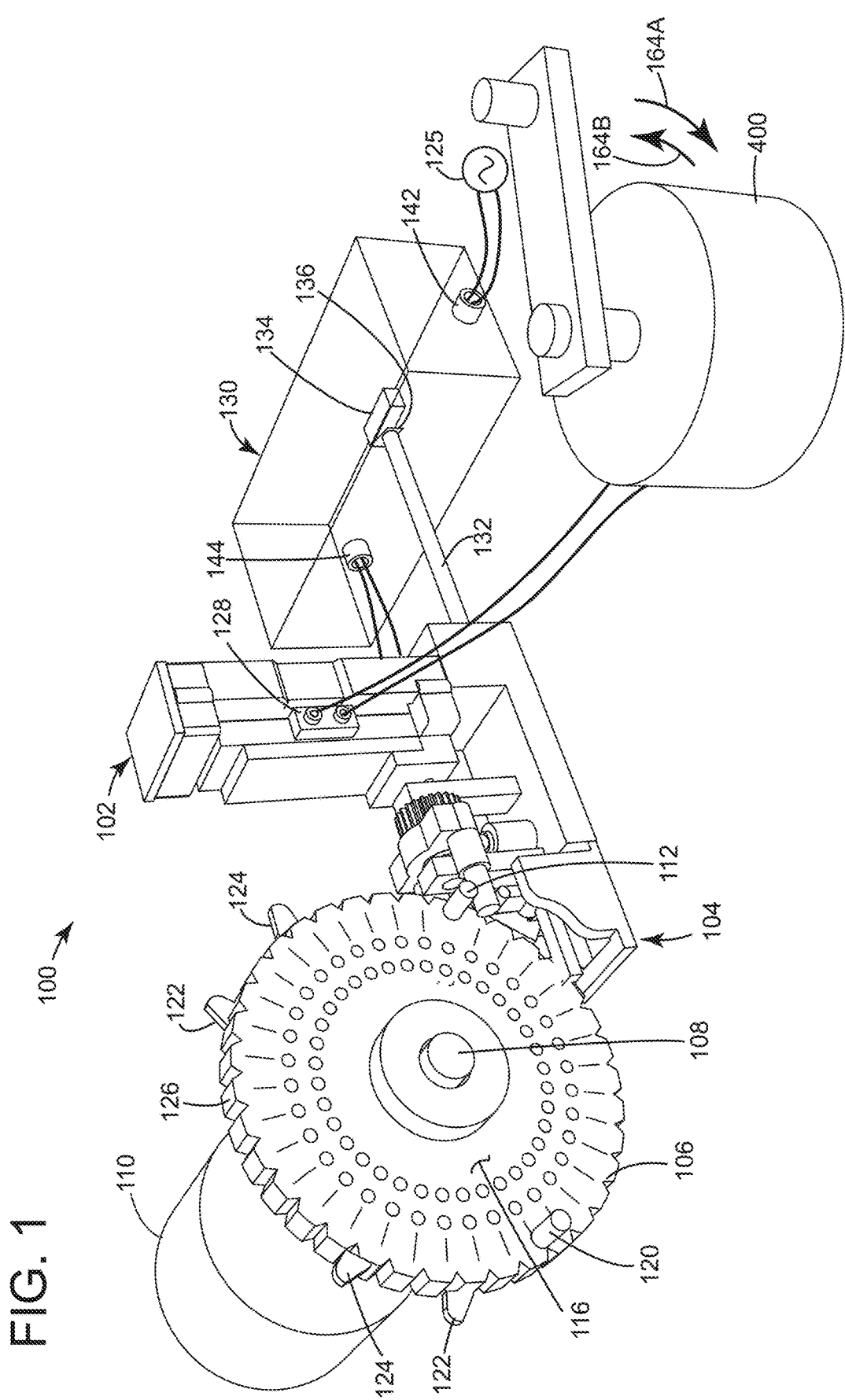
FIG. 1 depicts an example of a perspective view of a motor controller and associated electric motor, according to aspects described herein.
Figure 9:
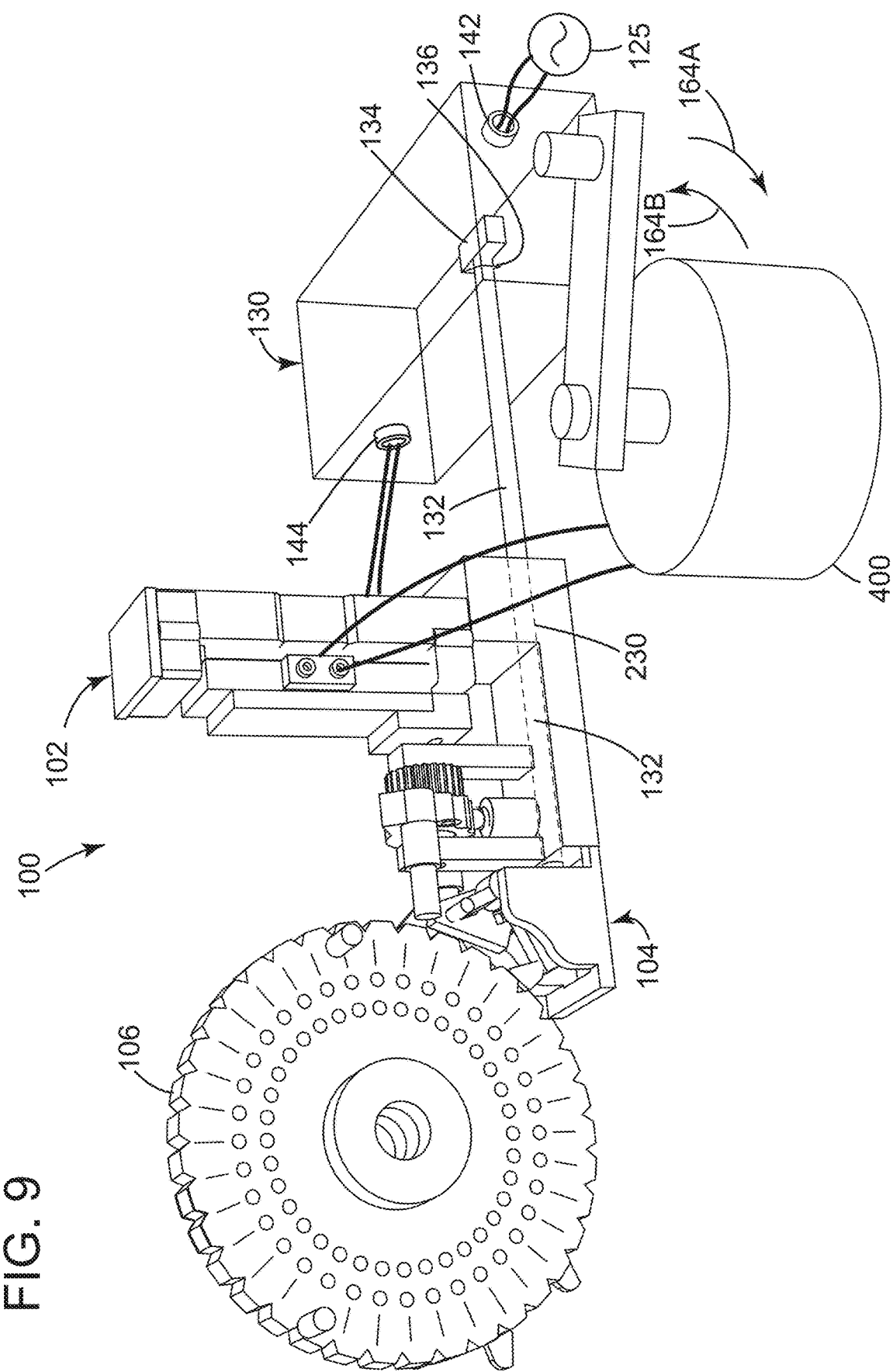

FIG. 8A' depicts an example of an enlarged view of the circular area 8A' of FIG. 8A;

FIG. 8B depicts an example of a perspective view of the speed trigger mechanism and its speed trigger rod of FIG. 8A in its extended position, according to aspects described herein;

FIG. 8B' depicts an example of an enlarged view of the circular area 8B' of FIG. 8B, according to aspects described herein; and FIG. 9 depicts an example of the speed trigger mechanism of FIG. 8A with speed trigger rod extending through a groove at a bottom of a base of the actuator to engage with a speed control switch that controls speed of the electric motor of FIG. 1, according to aspects described herein.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example maybe combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 2:
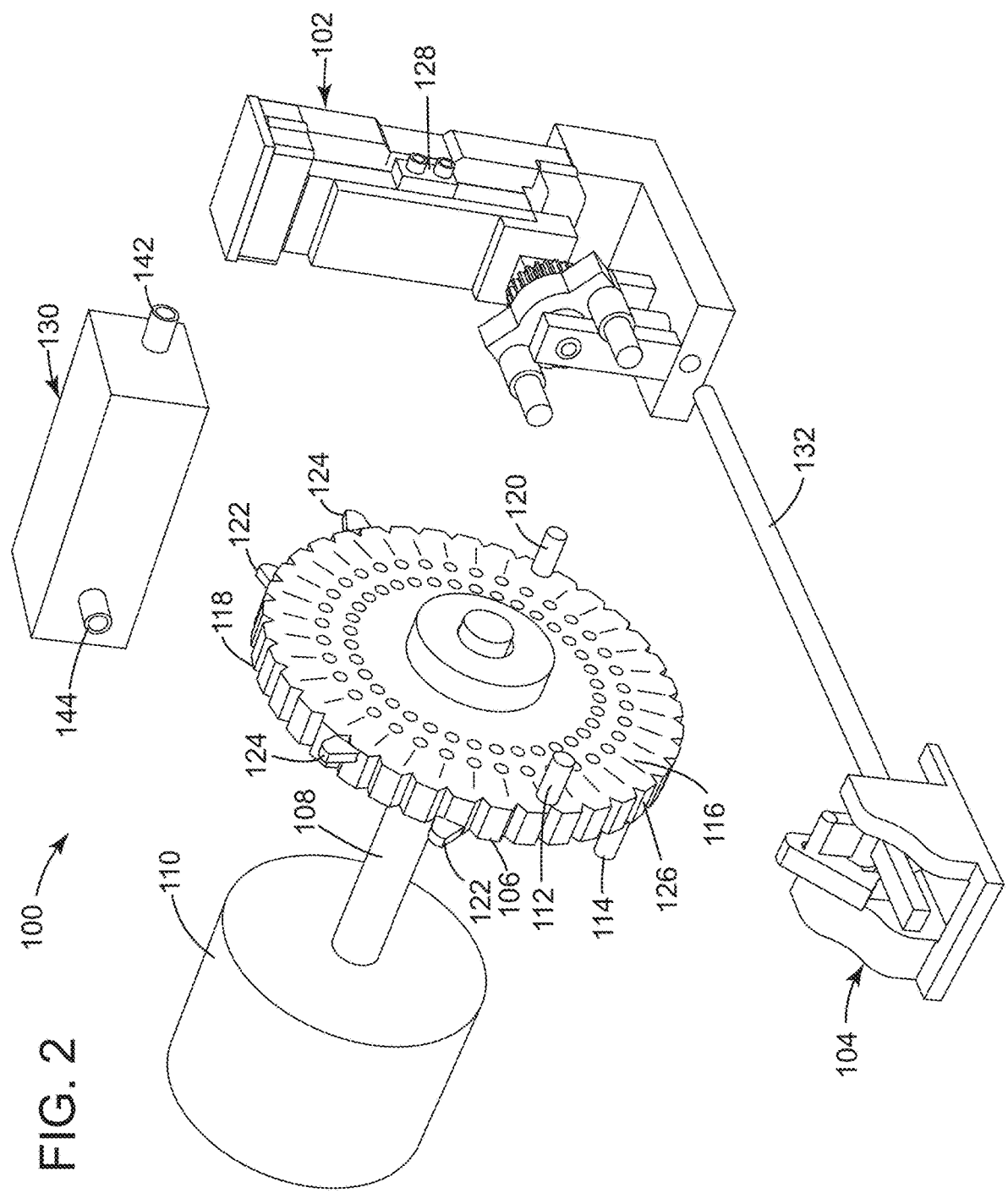
FIG. 2 depicts an example of an exploded view of the motor controller of FIG. 1, according to aspects described herein.

Referring to FIGS. 1 and 2, an example is depicted of a perspective view (FIG. 1) and an exploded view (FIG. 2) of a motor controller 100 and associated electric motor 400, according to aspects described herein. The motor 400 may be any alternating current (AC) or direct current (DC) electric motor. The motor controller 100 is operable to control such parameters as direction of rotation of the motor, speed of the motor, starting and stopping of the motor. The motor controller 100 may control such parameters exclusively through electromechanical components and systems. The motor controller may also control such parameters without the aid of computerized devices, such as a microprocessor, that include a programmable software package.

The motor controller 100 may include an actuator 102, a speed trigger mechanism 104 and a programmable wheel 106. The programmable wheel 106 may be mounted on a motorized shaft 108 that may be rotated by another electric motor 110. The wheel 106 may include one or more first directional appendages 112 and second directional appendages 114 mounted on first side surface 116 and a second side surface 118 of the wheel 106 respectively. The wheel 106 may also include stop appendages 120 mounted on either side 116, 118 of the wheel 106. The wheel 106 may also include one or more first speed appendages 122 and second speed appendages 124 mounted on a circumferential surface 126 of the wheel 106.

The term "wheel" as used herein, includes any apparatus having a circular frame that has a hub, or other rotational structure, for attachment to or suspension from an axle on which the wheel may revolve and bear a load. By way of example, a wheel may include such devices as a belt driven pulley, a gear, a circular disc or the like.

The actuator 102 receives external electric power from an external power source 125 and transmits that power to the motor 400 via power terminal 128. In the example illustrated in FIGS. 1 and 2, the actuator 102 receives the external electric power through a power bus 130.

As will be discussed in greater detail herein, the actuator 102 is configured to engage with the first and second directional appendages 112, 114 to control direction of rotation (as indicated by first directional arrow 164A and second directional arrow 164B) of the electric motor 400 by manipulating the polarity of the electric power prior to transmitting that power to the motor 400. Additionally, the actuator 102 may also engage with the one or more stop appendages 120 on the programmable wheel 106 to provide a stop function to the electric motor 400.

Also, as will be discussed in greater detail herein, the speed trigger mechanism 104 is configured to engage with the first and second speed appendages 122, 124 to control the speed of the electric motor 400. The speed trigger mechanism 104 includes a speed trigger rod 132 that is movable by the speed appendages 122, 124 between a retracted position (see FIGS. 8A and 8A') and an extended position (see FIGS. 8B and 8B'). The speed trigger rod 132 is configured to engage with a switching mechanism 136 of a speed control switch 134 to change the speed of the motor 400 as the speed trigger rod 132 moves between the extended and retracted positions.

The speed control switch 134 and its switching mechanism 136 may be of any appropriate design, such as, for example, a toggle switch with a toggle switching mechanism, a push button switch with a push button switching mechanism or the like. However, in the example illustrated in FIGS. 1 and 2, the speed control switch is a microswitch 134 and the switching mechanism 136 is a lever arm. Accordingly, the speed control switch 134 and switching mechanism 136 will be referred to interchangeably herein as the microswitch 134 and the lever arm 136.

Figure 3:
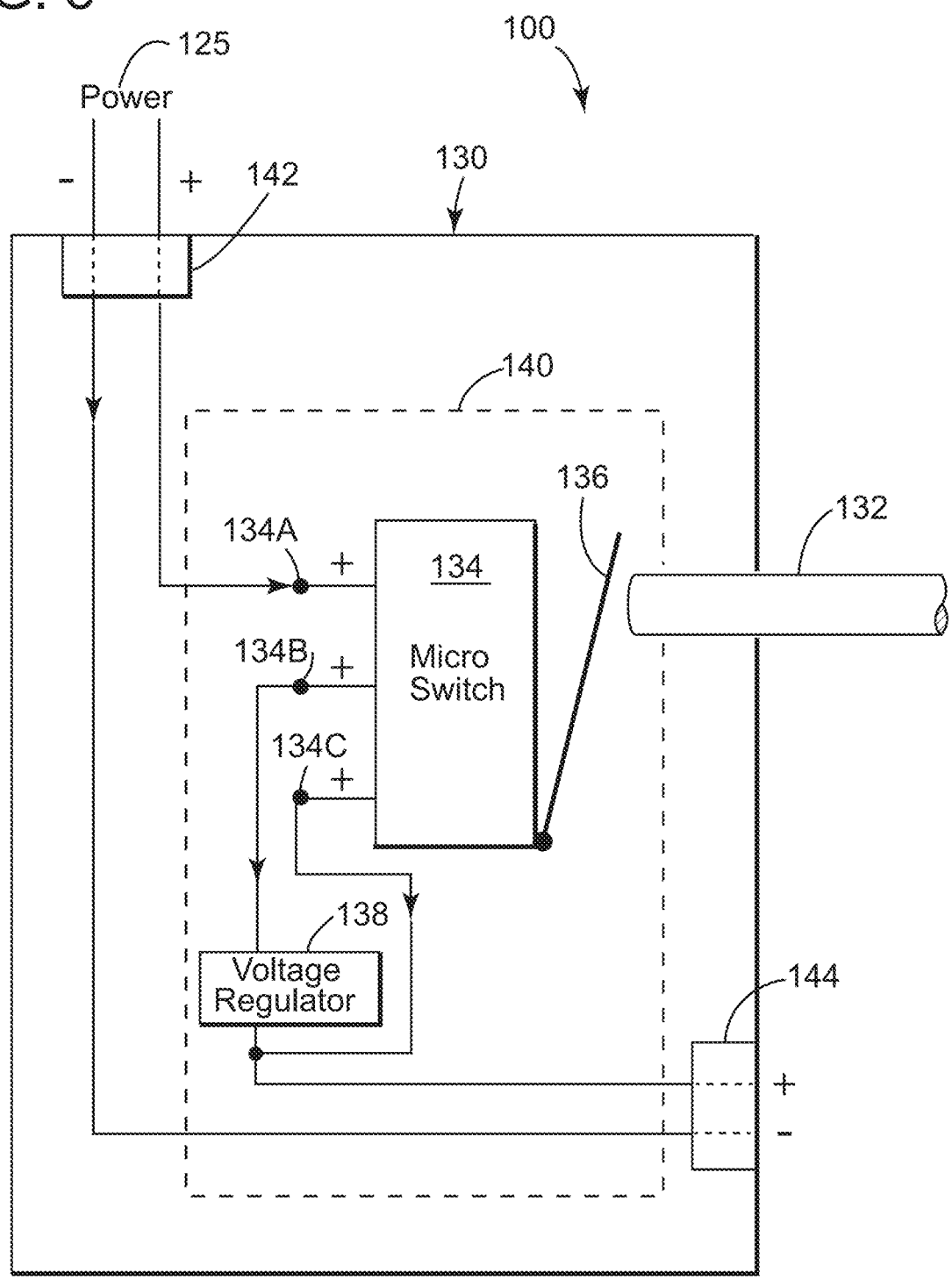
FIG. 3 depicts an example of a simplified schematic diagram of a power bus of the motor controller of FIG. 1, according to aspects described herein.

Referring to FIG. 3, an example is depicted of a simplified schematic diagram of the power bus 130 of the motor controller 100, according to aspects described herein. The microswitch 134 is mounted on a printed circuit board (PCB) 140 in the power bus 130. The microswitch 134 receives the external electric power 125 into its 134A terminal through power bus input connector 142, which is mounted on the power bus 130. The microswitch 134 is also wired to a voltage regulator 138 through its 134B terminal. When the speed trigger rod 132 is in its retracted position (see FIGS. 8A and 8A'), the lever arm 136 is released and the external electric power passes through the microswitch 134C terminal and bypasses the voltage regulator 138 to supply full unregulated voltage and power to the actuator 102 and electric motor 400 through power bus output connector 144, which is also mounted on the power bus 130. The electric motor 400 will, therefore, rotate at its maximum rotational speed. When the speed trigger rod 132 is in its extended position (see FIGS. 8B and 8B'), the lever arm 136 is depressed by the speed trigger rod 132, wherein the external electric power passes through the microswitch 134B terminal and is routed through the voltage regulator 138. Accordingly, the voltage regulator 138 supplies a lower regulated voltage and power to the actuator 102 and electric motor 400 through the power bus output connector 144 for a reduced rotational speed of the motor 400.

Though the microswitch is illustrated herein as being mounted within power bus 130, it is within the scope of this disclosure that no power bus be used at all. Rather the speed control switch 134 and its switching mechanism 136 may be wired and mounted in any appropriate design and/or fashion to engage with the speed trigger rod 132 and to change the speed of the motor 400 as the speed trigger rod moves between its extended and retracted positions.

Figure 4A:
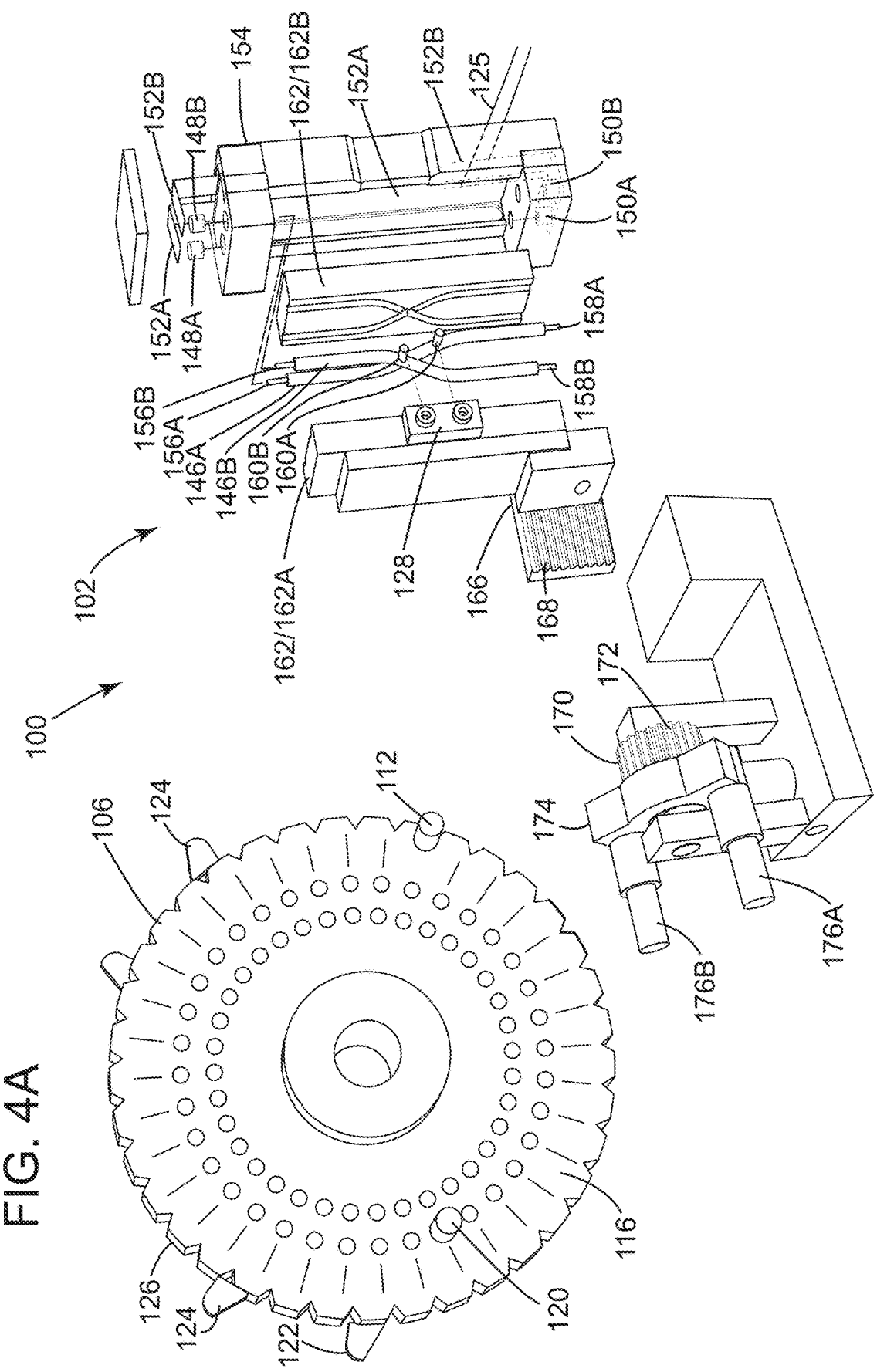
FIG. 4A depicts an example of a top, right side, exploded view of the actuator and programmable wheel of the motor controller of FIG. 1, wherein crisscrossed electrodes are engaged with upper rod contacts of the actuator, according to aspects described herein.

Referring to FIG. 4A, an example is depicted of a top, right side, exploded view of the actuator 102 and programmable wheel 106 of the motor controller 100, wherein crisscrossed electrodes 146A and 146B are engaged with upper rod contacts 148A and 148B of the actuator 102, according to aspects described herein.

Figure 4B:
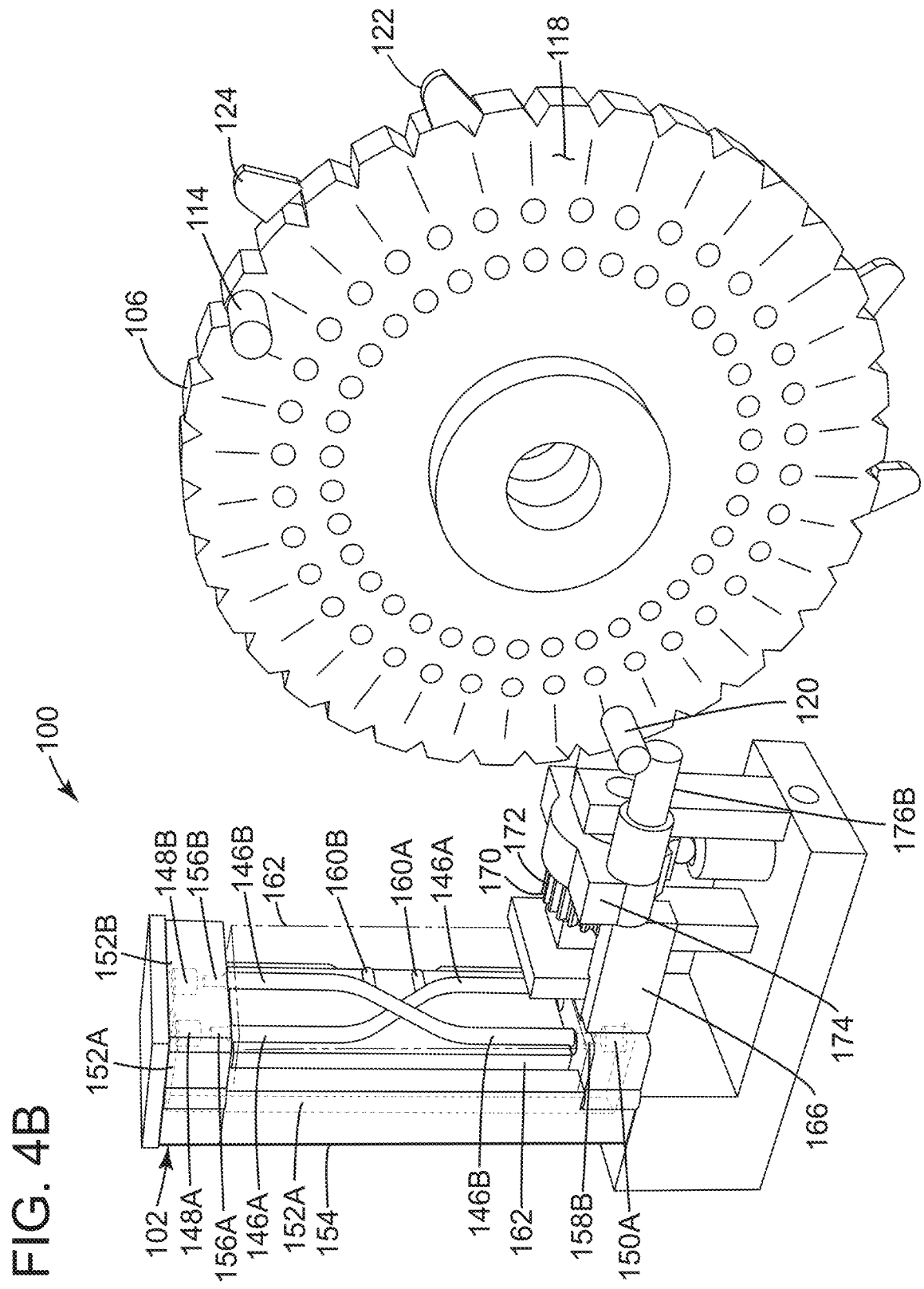
FIG. 4B depicts an example of a top, left side, exploded view of the actuator and programmable wheel of the motor controller of FIG. 1, wherein crisscrossed electrodes are isolated from upper and lower rod contacts of the actuator, according to aspects described herein.

Referring also to FIG. 4B, an example is depicted of a top left side exploded view of the actuator 102 and programmable wheel 106 of the motor controller 100, wherein the crisscrossed electrodes 146A and 146B are isolated from the upper rod contacts 148A, 148B and also isolated from lower rod contacts 150A and 150B of the actuator 102, according to aspects described herein.

Figure 4C:
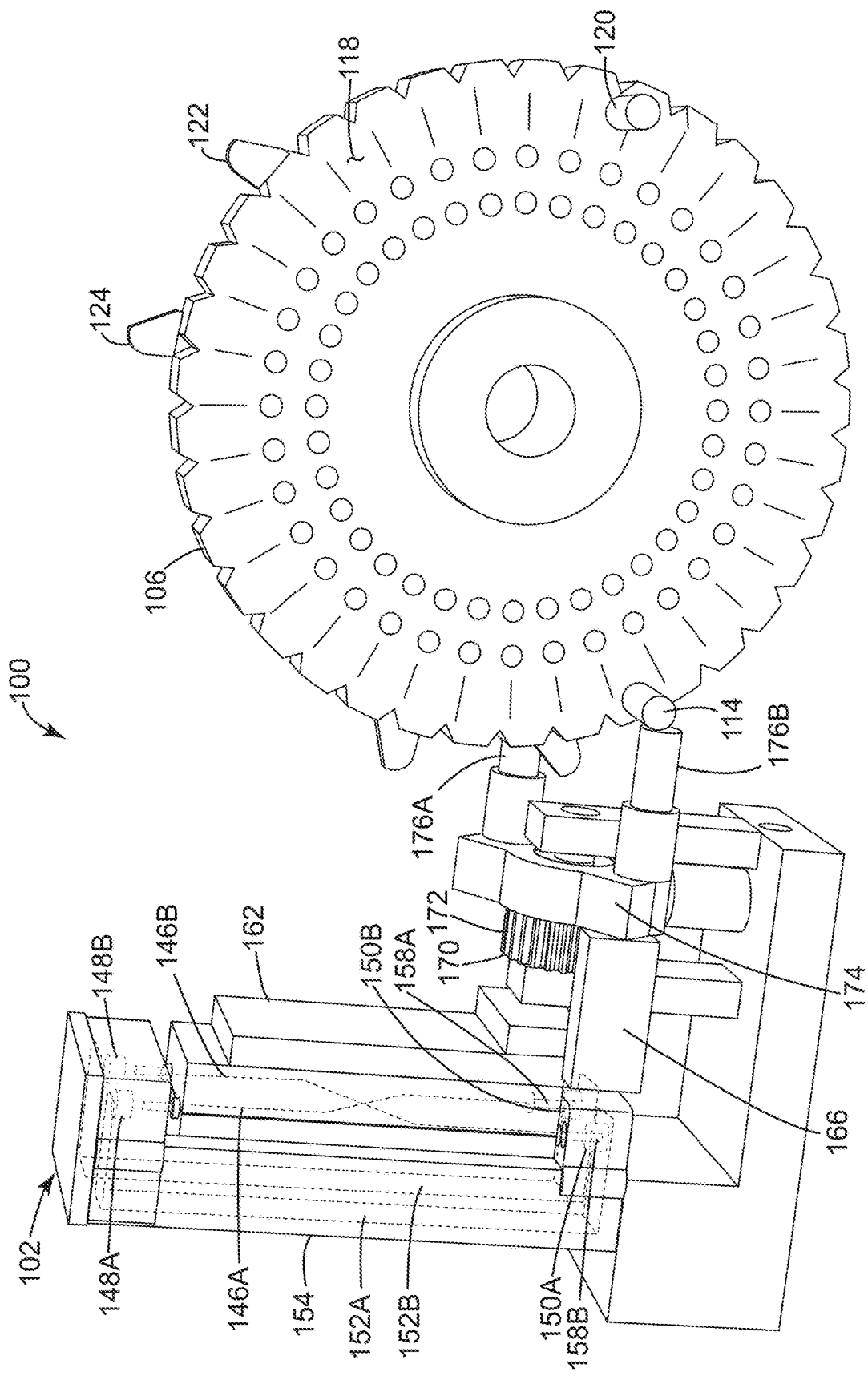
FIG. 4C depicts an example of a top, left side, exploded view of the actuator and programmable wheel of the motor controller of FIG. 1, wherein crisscrossed electrodes are engaged with lower rod contacts of the actuator, according to aspects described herein.

Referring also to FIG. 4C, an example is depicted of a top left side exploded view of the actuator 102 and programmable wheel 106 of the motor controller 100, wherein the crisscrossed electrodes 146A, 146B are engaged with lower rod contacts 150A, 150B of the actuator 102, according to aspects described herein.

The actuator 102 of the motor controller 100 includes a first conductive rod 152A and a second conductive rod 152B that are configured to receive the external electric power from an external source 125. Each rod 152A, 152B includes the upper rod contacts 148A, 148B and the lower rod contacts 150A, 150B. Each upper rod contact 148A, 148B may be positioned on an upper portion and/or upper distal end of the first and second rods 152A, 152B respectively. Each lower rod contact 150A, 150B may be positioned on a lower portion and/or lower distal end of the first and second rods 152A, 152B respectively. The first and second conductive rods 152A, 152B may be housed in a rod housing 154.

A first crisscrossed electrode 146A and a second crisscrossed electrode 146B are crisscrossed longitudinally relative to each other. The crisscrossed electrodes 146A, 146B are movable between, and electrically connectable to, the upper rod contacts 148A, 148B and the lower rod contacts 150A, 150B. The first crisscrossed electrode 146A has an upper end contact 156A and a lower end contact 158A, with a power contact 160A disposed therebetween. The second crisscrossed electrode 146B also has an upper end contact 156B and a lower end contact 158B, with a power contact 160B disposed therebetween. The power contacts 160A, 160B are electrically connected to the power terminal 128 through which the external electric power is routed to the electric motor 400.

In the example illustrated in FIGS. 4A-4C, the first and second crisscrossed electrodes are housed within a wire housing 162. The wire housing has a front portion 162A and a back portion 162B, which secure the crisscrossed electrodes 146A, 146B therebetween. The wire housing 162 is operable to move along the rod housing 154 to electrically connect the first and second crisscrossed electrodes 146A, 146B to the upper rod contacts 148A, 148B of each rod 152A, 152B or the lower rod contacts 150A, 150B of each rod 152A, 152B.

Referring more specifically to FIG. 4A, when the crisscrossed electrodes 146A, 146B are moved to the upper portion of the rods 152A, 152B, the upper end contact 156A of the first crisscrossed electrode 146A is electrically connected to the upper rod contact 148A of the first conductive rod 152A, and the upper end contact 156B of the second crisscrossed electrode 146B is electrically connected to the upper rod contact 148B of the second rod 152B to route the external electric power through the power contacts 160A, 160B to the power terminal 128 at a first polarity. Accordingly, the motor 400 that is electrically connected to the power terminal 128 will be rotated in a first rotational direction (as indicated by directional arrow 164A in FIG. 1). As illustrated in the example of FIG. 1, the first rotational direction 164A is clockwise, however, the first rotational direction 164A may also be counterclockwise.

Referring more specifically to FIG. 4C, when the crisscrossed electrodes 146A, 146B are moved to the lower portion of the rods 152A, 152B, the lower end contact 158B of the second crisscrossed electrode 146B is electrically connected to the lower rod contact 150A of the first conductive rod 152A, and the lower end contact 158A of the first crisscrossed electrode 146A is electrically connected to the lower rod contact 150B of the second rod 152B to route the external electric power through the power contact 160A, 160B to the power terminal 128 at a second polarity. Accordingly, the motor 400 that is electrically connected to the power terminal 128 will be rotated in a second rotational direction (as indicated by directional arrow 164B in FIG. 1). As illustrated in the example of FIG. 1, the second rotational direction 164B is counterclockwise, however, the second rotational direction 164B may also be clockwise.

Referring more specifically to FIG. 4B, when the crisscrossed electrodes 146A, 146B are moved into electrical isolation from the upper 148A, 148B and lower 150A, 150B rod contacts to isolate the electric power from the power terminal 128, then the electric motor 400 is stopped from rotating in either direction 164A, 164B. More specifically, when the crisscrossed electrodes 146A, 146B are moved to a middle portion of the conductive rods 152A, 152B such that the upper end contacts 156A, 156B are not electrically connected to the upper rod contacts 148A, 148B and the lower end contacts 158A, 158B are not electrically connected to the lower rod contacts 150A, 150B, then the external electric power is cut off from the power terminal 128 and the motor 400 stops.

The actuator 102 also includes a transmission rack 166, having linear rack teeth 168 (see FIG. 4A). The transmission rack 166 is affixed to the wire housing 162. The actuator 102 also includes a rotationally mounted transmission gear 170, having circular gear teeth 172. The gear teeth 172 are configured to engage with the rack teeth 168 to convert a circular movement of the transmission gear 170 to a linear movement of the transmission rack 166. The linear motion of the transmission rack 166 imparts a linear motion to the crisscrossed electrodes 146A, 146B within the wire housing 162.

The actuator also includes a transmission gear attachment 174, which is affixed to the transmission gear 170 and rotates with it. The transmission gear attachment 174 has a first standoff 176A and a second standoff 176B, which are affixed to opposing ends of the transmission gear attachment 174.

As discussed earlier, the programmable wheel 106 is mounted on a motorized shaft 108 and has one or more (e.g., a plurality of) first directional appendages 112, second directional appendages 114 and stop appendages 120 mounted thereon. The directional appendages 112, 114 and stop appendages 120 may be mounted at various locations on the programmable wheel 106 to program in various directional and stop functions of the motor 400 as required for any particular application. For example, the rotation of the programmable wheel 106 may be configured to match the duty cycle of the motor 400. Within that duty cycle, the programmable wheel 106 may be programmed by the various appendages to perform all of the basic required functions (e.g. start, stop, clockwise or counterclockwise rotation and speed changes) of the motor 400 during the duty cycle. The duty cycle of the motor 400 and the rotational duration of the programmable wheel 106 may be, for example, anywhere from about between 1 minute to 24 hours or more.

The wheel 106 is configured to engage the actuator 102 such that for each revolution of the wheel 106:
- Each first directional appendage 112 moves the crisscrossed electrodes 146A, 146B into electrical contact with the upper rod contacts 148A, 148B (FIG. 4A) to route the electric power to the power terminal 128 at a first polarity. The electric power at the first polarity is operable to turn an electric motor 400 electrically connected thereto in the first direction 164A.
- Each second directional appendage 114 moves the crisscrossed electrodes 146A, 146B into electrical contact with the lower rod contacts 150A, 150B (FIG. 4C) to route the electrical power to the power terminal 128 at the second opposing polarity. The electric power at the second polarity is operable to turn the electrically connected electric motor 400 in the second opposite direction 164B.
- Each stop appendage 120 moves the crisscrossed electrodes 146A, 146B into electrical isolation from the upper 148A, 148B and lower 150A, 150B rod contacts (FIG. 4B) to isolate the electric power from the power terminal 128, thereby stopping the electrically connected motor 400 from rotating.

More specifically, the first 112 and second 114 directional appendages may be configured to be mounted on first 116 and second 118 opposing side surfaces of the programmable wheel 106 respectively. For example, the first directional appendages 112 may be configured to be mounted on the right (e.g., first) side 116 of the programmable wheel 106 and the second directional appendages 114 may be configured to be mounted on the left (e.g., second) side 118 of the programmable wheel 106. The directional appendages 112, 114 may be mounted such that distal ends of the directional appendages 112, 114 are a first radial distance 178 (see FIGS. 7B and 7C) from a rotational center 180 of the wheel 106.

Additionally, the stop appendage 120 may be configured to be mounted on either the first 116 and/or the second 118 side surfaces of the wheel 106. The stop appendage 120 may be mounted such that a distal end of the stop appendage 120 is a second radial distance 182 (see FIGS. 7B and 7C) from the rotational center 180 of the wheel 106. The second radial distance 182 may be less than the first radial distance 178.

The reason the directional appendages 112, 114 are located a greater first radial distance 178 from the center 180 of the wheel 106 is because the directional appendages 112, 114 must remain in contact with the first and second standoffs 176A, 176B for a greater arc of the wheel's rotation than the stop appendages 120 do. This is because the directional appendages 112, 114 must push the standoffs 176A, 176B down a sufficient distance to enable the crisscrossed electrodes 146A, 146B to make electrical contact with the upper rod contacts 148A, 148B or the lower rod contacts 150A, 150B.

In contrast, the stop appendages 120 are located a lesser second radial distance 182 since their arc of contact with the standoffs 176A, 176B is smaller. This is because, the stop appendages 120 must only push the standoffs 176A, 176B down a sufficient distance to disconnect the crisscrossed electrodes 146A, 146B from the upper 148A, 148B or lower 150A, 150B contact rods but not so much of a distance to reconnect the crisscrossed electrodes with the opposing rod contacts.

Accordingly, for each revolution of the programmable wheel 106:
- The first directional appendage 112 is configured to push the first standoff 176A down a sufficient distance to linearly move the crisscrossed electrodes 146A, 146B within the wire housing 162 upwards into electrical contact with the upper rod contacts 148A, 148B (see FIG. 4A).
- The second directional appendage 114 is configured to push the second standoff 176B down a sufficient distance to linearly move the crisscrossed electrodes 146A, 146B within the wire housing 162 downwards into electrical contact with the lower rod contacts 150A, 150B (see FIG. 4C).
- The stop appendage 120 is configured to push the first 176A or second 176B standoffs down a sufficient distance to linearly move the crisscrossed electrodes 146A, 146B within the wire housing 162 such that the crisscrossed electrodes 146A, 146B are electrically isolated from the upper 148A, 148B and lower 150A, 150B rod contacts (see FIG. 4B). Accordingly, the disconnected crisscrossed electrodes 146A, 146B electrically isolate the electric power from the power terminal 128 and stop the electrically connected motor 400 from rotating.

Figure 5A:
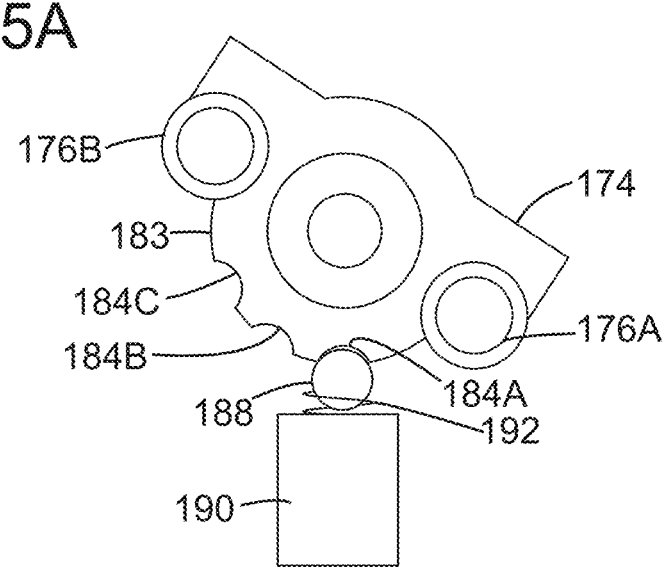
FIG. 5A depicts an example of a side view of a transmission gear attachment of the motor controller of FIG. 1, wherein the transmission gear attachment is rotated to a first position, according to aspects described herein.
Figure 5B:
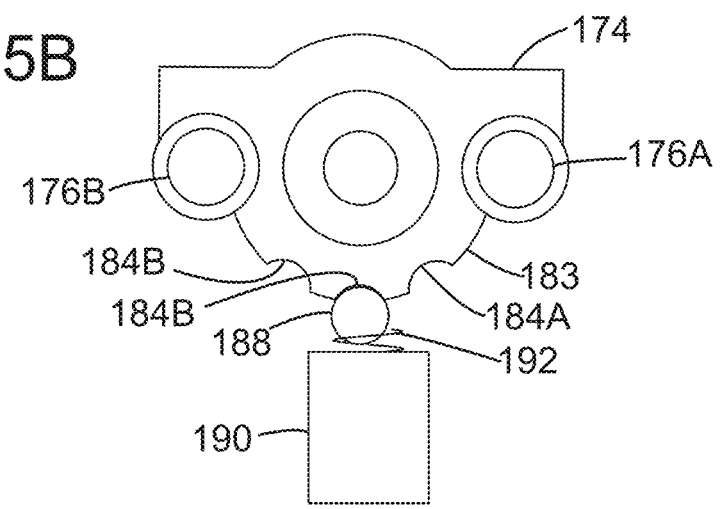
FIG. 5B depicts an example of a side view of the transmission gear attachment of FIG. 5A rotated to a second position, according to aspects described herein.
Figure 5C:
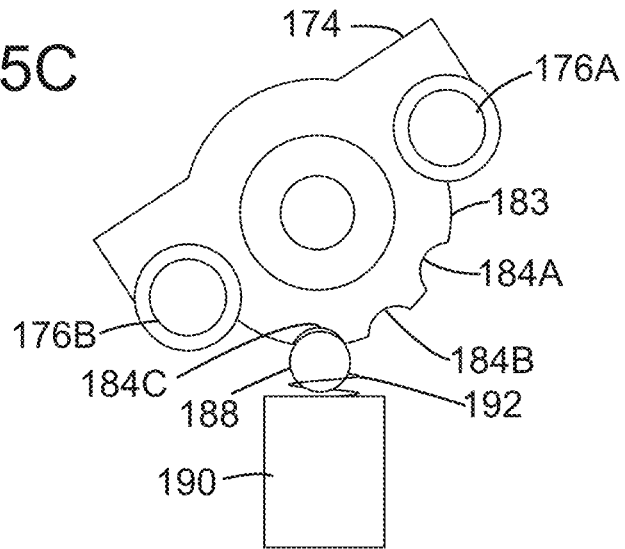
FIG. 5C depicts an example of a side view of the transmission gear attachment of FIG. 5A rotated to a third position, according to aspects described herein.

Referring to FIGS. 5A, 5B and 5C, an example is depicted of a side view of the transmission gear attachment 174 of the actuator 102, wherein the transmission gear attachment 174 is rotated to a first position (FIG. 54A), a second position (FIG. 5B) and a third position (FIG. 5C), according to aspects described herein.

The transmission gear attachment 174 may include a lower circumferential surface 183 having first 184A, a second 184B and a third 184C semi-circular grooves disposed therein. Additionally, the transmission gear attachment 174 may be configured to rotate with the transmission gear 170 between a first position (FIG. 5A), a second position (FIG. 5B) and a third position (FIG. 5C), wherein:

In the first rotational position (FIG. 5A), the crisscrossed electrodes 146A, 146B are in electrical contact with the upper rod contacts 148A, 148B, thereby providing electrical power to the motor 400 at the first polarity and rotating the motor 400 in the first rotational direction 164A.

In the second rotational position (see FIG. 5B), the crisscrossed electrodes 146A, 146B are electrically isolated from the upper 148A, 148B and lower 150A, 150B rod contacts, thereby isolating electrical power to the motor 400 and stopping rotation of the motor 400.

In the third rotational position (see FIG. 5C), the crisscrossed electrodes 146A, 146B are in electrical contact with the lower rod contacts 150A, 150B, thereby providing electrical power to the motor 400 at the second polarity and rotating the motor 400 in the second rotational direction 164B.

The actuator 102 may also include a spring loaded attachment bearing 188 disposed within an upwardly extending tube 190. A spring 192 disposed within the tube 190 urges the attachment bearing 188 against the circumferential surface 183 of the transmission gear attachment 174. When the transmission gear attachment 174 is in its first position (FIG. 5A), the attachment bearing 188 is urged by the spring 192 into the first semi-circular groove 184A. When the transmission gear attachment 174 is in its second position (FIG. 5B), the attachment bearing 188 is urged by the spring 192 into the second semi-circular groove 184B. When the transmission gear attachment 174 is in its third position (FIG. 5C), the attachment bearing 188 is urged by the spring 192 into the third semi-circular groove 184C. Accordingly, the spring loaded attachment bearing 188 holds the transmission gear attachment 174 in its three positions 186A, 186B and 186C until sufficient force is applied by the first or second directional appendages 112, 114 or by a stop appendage 120 to rotate the transmission gear attachment 174 to another position.

Figure 6A:
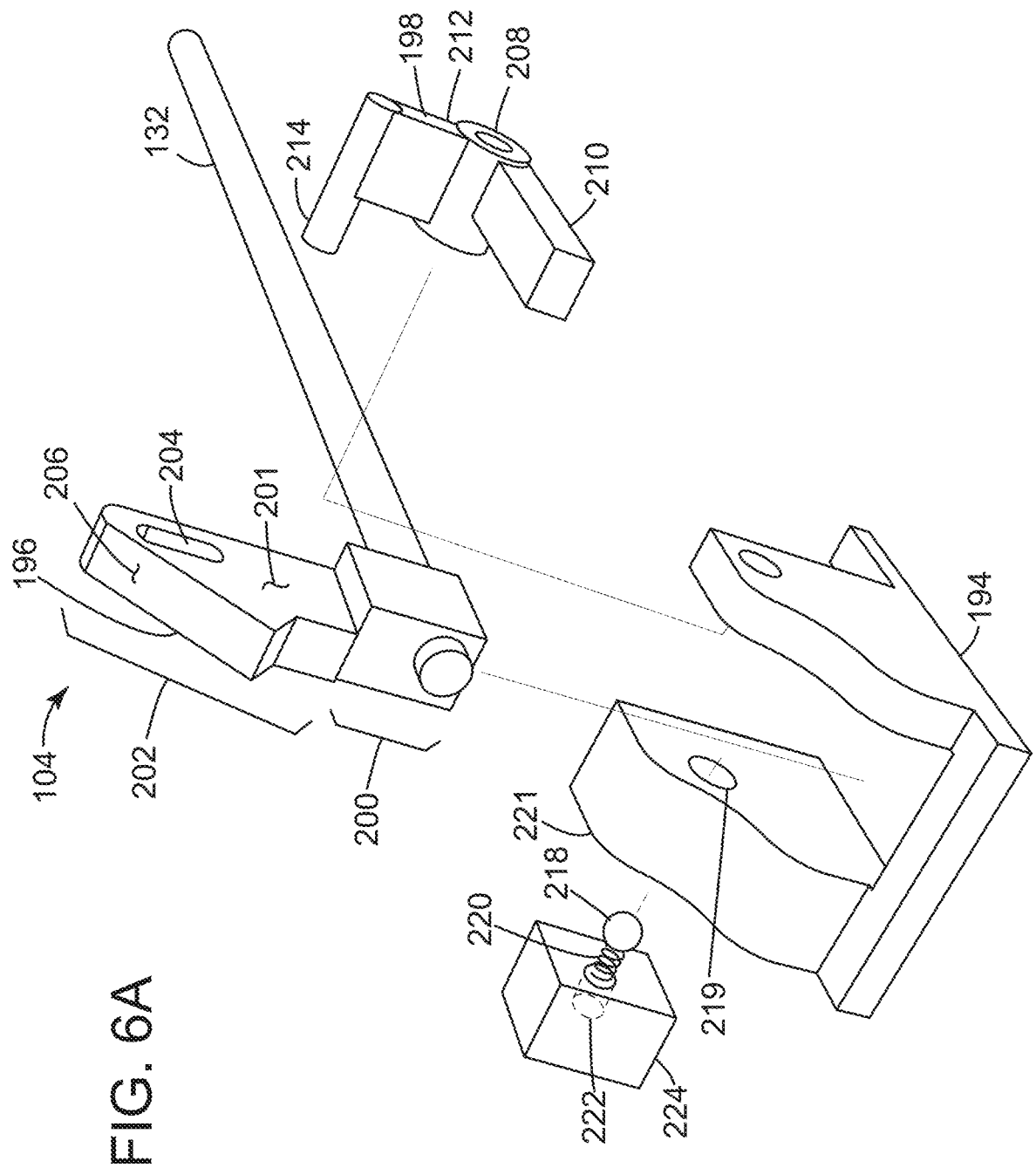
FIG. 6A depicts an example of a top, right side, exploded view of a speed trigger mechanism of the motor controller of FIG. 1, according to aspects described herein.
Figure 6B:
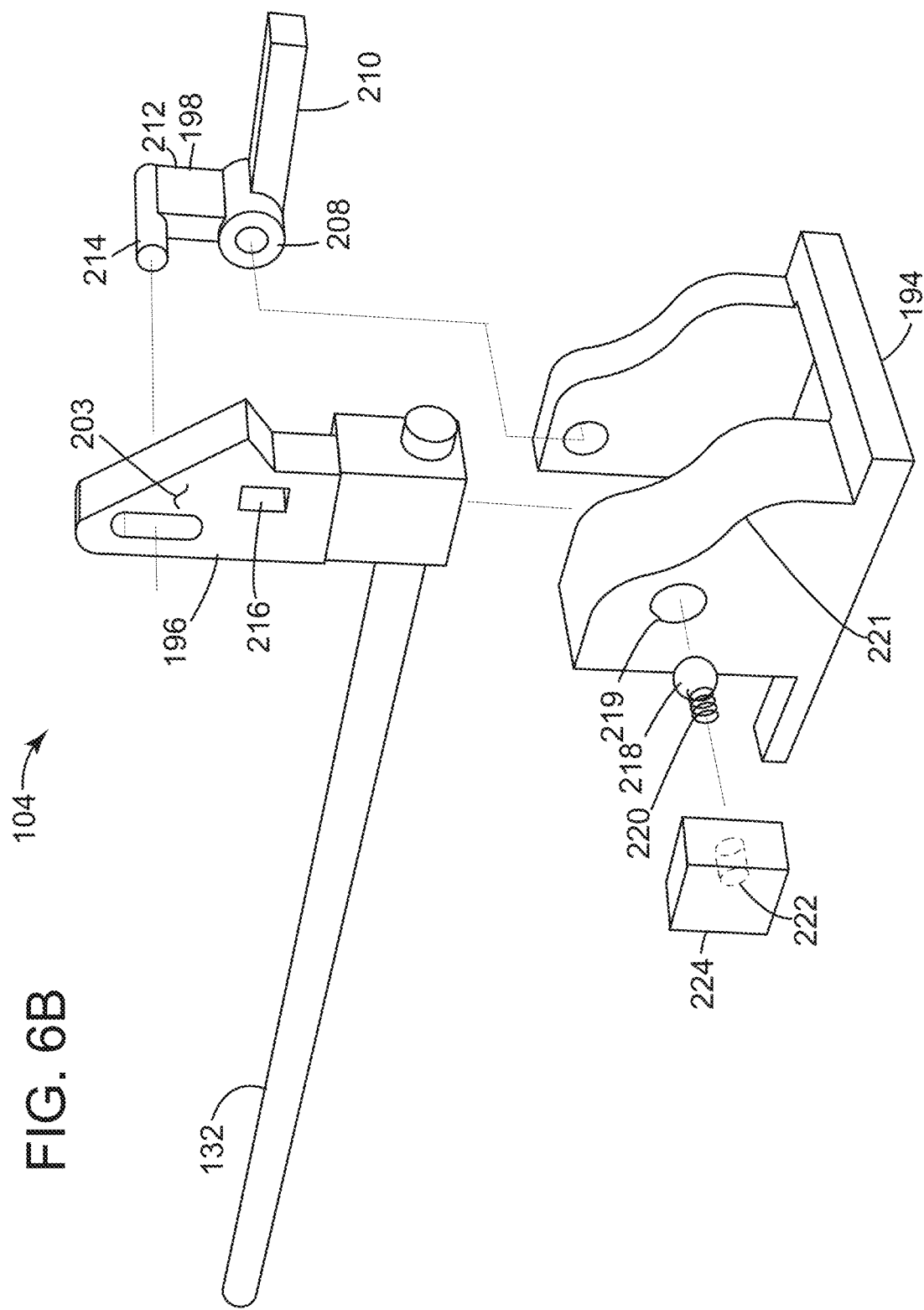
FIG. 6B depicts an example of a top, left side, exploded view of the speed trigger mechanism of FIG. 6A, according to aspects described herein.

Referring to FIGS. 6A and 6B, an example is depicted of a top, right side, exploded view (FIG. 6A) and a top, left side, exploded view (FIG. 6B) of the speed trigger mechanism 104 of the motor controller 100 of FIG. 1, according to aspects described herein. As disclosed earlier herein, the speed trigger mechanism 104 engages with the speed appendages 122, 124 on the programmable wheel 106 to move the speed trigger rod 132 between a retracted position (see FIGS. 8A and 8A') and an extended position (see FIGS. 8B and 8B'). The speed trigger rod 132 is configured to engage with the switching mechanism (e.g., lever arm) 136 of the speed control switch (e.g., microswitch) 134 to change the speed of the motor 400 as the speed trigger rod 132 moves between the extended and retracted positions.

More specifically, for each revolution of the programmable wheel 106:

The first speed appendage 122 engages the speed trigger mechanism 104 to move the speed trigger rod 132 into its extended position (see FIGS. 8B and 8B'), thereby moving the switching mechanism 136 of the speed control switch 134 to its first switch position to operate the electric motor 400 at a first speed.

The second speed appendage 124 engages the speed trigger mechanism 104 to move the speed trigger rod 132 into its retracted position (see FIGS. 8A and 8A'), thereby moving the switching mechanism 136 of the speed control switch 134 to its second switch position to operate the electric motor 400 at a second different speed.

In the examples illustrated herein, the speed control switch is a microswitch 134 and the switching mechanism is a spring loaded lever arm 136 of the microswitch. When the speed trigger rod 132 moves into its extended position (see FIGS. 8B and 8B'), the speed trigger rod 132 depresses the lever arm 136 against a spring (not shown) of the microswitch (or speed control switch) 134 to move the lever arm 136 into the first switch position of the lever arm (or switching mechanism) 136. When the speed trigger rod 132 moves into its retracted position, the speed trigger rod 132 releases the lever arm 136 so that the spring (not shown) of the microswitch 134 urges the lever arm 136 into its second switch position of the lever arm 136.

In the first switch position, the microswitch 134 is configured to provide a low regulated voltage from voltage regulator 138 (see FIG. 3) to motor 400 and thereby make the first rotational speed of the motor 400 be less than its maximum speed. In the second switch position, the microswitch 134 is configured to provide a higher unregulated voltage (see FIG. 3) to motor 400 and thereby make the second rotational speed of motor 400 be its maximum speed. However, it is within the scope of this disclosure, that the second speed may be slower than the first speed and that neither speed is the maximum speed of the motor 400.

Referring again to FIG. 6A, the speed trigger mechanism 104 includes a speed trigger base 194, a speed trigger 196 and a speed trigger release 198. The speed trigger 196 is slidably disposed within the speed trigger base 194. A lower portion 200 of the speed trigger 196 is configured to fixedly attach to the speed trigger rod 132 and slidably engage with the speed trigger base 194. An upper portion 202 of the speed trigger 196 includes an upwardly extending side slot 204 that is disposed on a first side surface 201 of the speed trigger 196. The upper portion 202 also includes an inclined front surface 206 that is configured to face the circumferential surface 126 (see FIG. 7A) of the wheel 106.

The speed trigger release 198 is also disposed within the speed trigger base 194 adjacent the speed trigger 196. The speed trigger release 198 has a center portion 208 that is pivotally attached to the speed trigger base 194. The speed trigger release 198 also includes a first speed trigger release lever 210 and a second speed trigger release lever 212. The first and second speed trigger release levers 210, 212 extend substantially perpendicularly relative to each other from the center portion 208. The first trigger release lever 210 is configured to extend toward the circumferential surface 126 of the programmable wheel 106. The second trigger release lever 212 has a tab 214 disposed on an end portion of the second trigger release lever 212 that extends laterally into the side slot 204 of the speed trigger 196.

During operation, for each revolution of the programmable wheel 106:

The first speed appendage 122 pushes down on the inclined front surface 206 of the speed trigger 196 to slide the speed trigger 196 further away from the programmable wheel 106, thereby moving the speed trigger rod 132 into its extended position to operate the electric motor 400 at the first speed.

The second speed appendage 124 pushes down on the first lever 210 of the speed trigger release 198 to pivot the second speed trigger lever 212 toward the programmable wheel 106. As the second speed trigger lever 212 pivots toward the wheel 106, the tab 214 of the second speed trigger lever 212 pushes on the side slot 204 of the speed trigger 196 to slide the speed trigger 196 toward the programmable wheel 106, thereby moving the speed trigger rod 132 into its retracted position to operate the electric motor 400 at the second speed.

Referring again to FIG. 6B, the speed trigger 196 also includes a semi-circular groove 216 that is disposed in a second side surface 203 of the speed trigger 196. A trigger bearing 218 and a trigger bearing loading spring 220 are disposed within a horizontally extending tube 222. The tube 222 may be integrally formed into a trigger bearing housing 224 that is affixed to the speed trigger base 194. The spring 220 urges the trigger bearing 218 through a through-hole 219 in a sidewall 221 of the speed trigger base 194 and against the second side surface 203 of the speed trigger 196. When the speed trigger rod 132 is in its extended position, the trigger bearing 218 is urged by the spring 200 into the semi-circular groove 216. Accordingly, the trigger bearing 218 prevents the speed trigger rod 132 from being pushed out of its extended position by the spring loaded lever arm 136 of the microswitch 134 until the second speed appendage 124 pushes down on the first lever 210 of the speed trigger release 198.

Figure 7B:
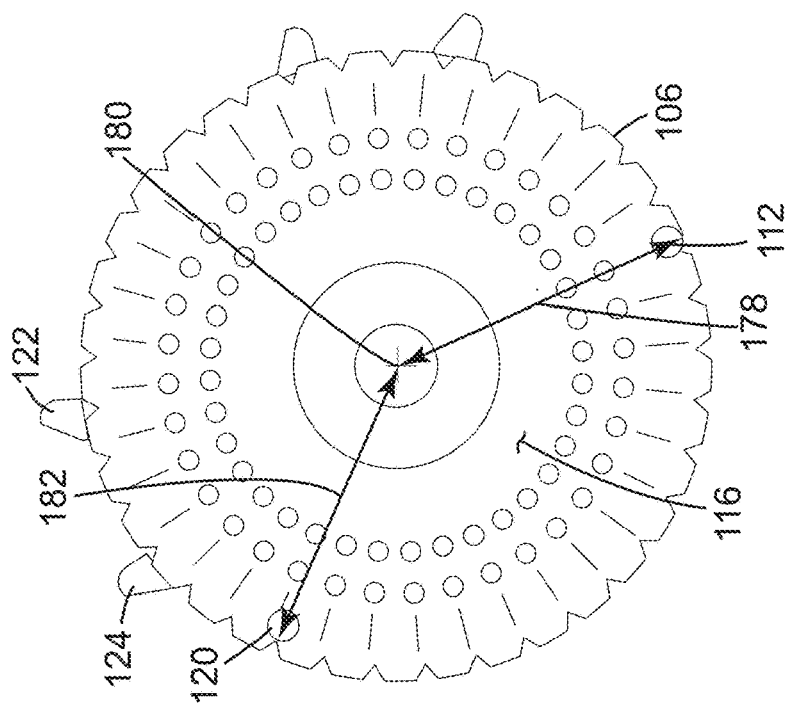
FIG. 7B depicts an example of a right side view of the programmable wheel of FIG. 7A, according to aspects described herein.
Figure 7A:
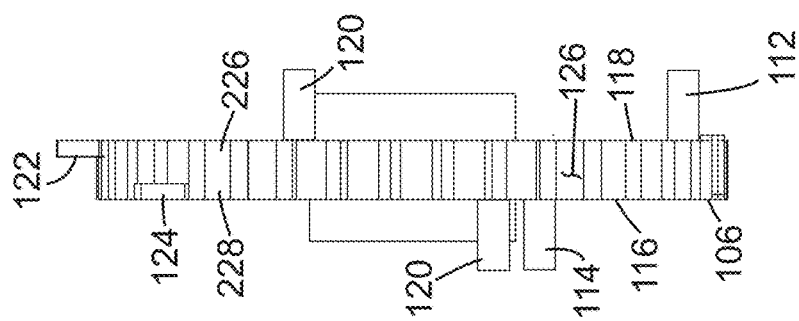
FIG. 7A depicts an example of a top view of the programmable wheel of the motor controller of FIG. 1, according to aspects described herein.
Figure 7C:
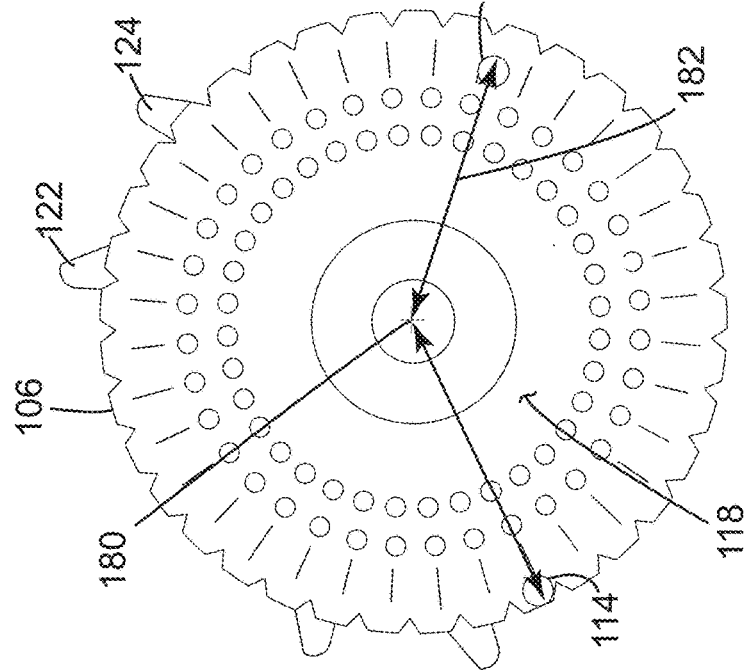
FIG. 7C depicts an example of a left side view of the programmable wheel of FIG. 7B, according to aspects described herein.

Referring to FIGS. 7A, 7B and 7C, an example is depicted of a top view (FIG. 7A), right side view (FIG. 7B) and left side view (FIG. 7C) of the programmable wheel 106 of the motor controller 100, according to aspects described herein. The programmable wheel 106 includes a first side surface 116, a second opposing side surface 118 with a circumferential surface 126 extending therebetween. In the example illustrated in FIGS. 7A-7C, the first side surface 116 is considered to be on the right side of the wheel 106 and the second side surface 118 is considered to be on the left side of the wheel 106.

Referring to FIG. 7A (i.e., the top view), it can be seen that one or more (a plurality) of the first speed appendages 122 may be mounted on a first lateral edge portion 226 of the circumferential surface 126 of the programmable wheel 106. As the wheel 106 rotates, the first speed appendage 122 pushes down on the inclined front surface 206 of the speed trigger 196 to slide the speed trigger 196 further away from the programmable wheel 106, thereby moving the speed trigger rod 132 into its extended position to operate the electric motor 400 at the first speed.

It can also be seen that one or more (a plurality) of the second speed appendages 124 may be mounted on a second lateral edge portion 228 of the circumferential surface 126 of the programmable wheel 106. As the wheel 106 rotates, the second speed appendage 124 pushes down on the first lever 210 of the speed trigger release 198 to pivot the second speed trigger lever 212 toward the programmable wheel 106. As the second speed trigger lever 212 pivots toward the wheel 106, the tab 214 of the second speed trigger lever 212 pushes on the side slot 204 of the speed trigger 196 to slide the speed trigger 196 toward the programmable wheel 106, thereby moving the speed trigger rod 132 into its retracted position to operate the electric motor 400 at the second speed.

Referring to FIG. 7B (i.e., the right side view), it can be seen that, on the first side surface 116 of the wheel 106, one or more of the first directional appendages 112 may be mounted a first radial distance 178 from the rotational center 180 from the wheel 106. Additionally, one or more of the stop appendages 120 may be mounted a second smaller radial distance 182 from the rotational center of the wheel.

Accordingly, as the wheel rotates, the first directional appendages 112 push down on the first standoff 176A a sufficient distance to linearly move the crisscrossed electrodes 146A, 146B within the wire housing 162 upwards into electrical contact with the upper rod contacts 148A, 148B (see FIG. 4A). Additionally, the stop appendages 120 push the first 176A standoffs down a sufficient distance to linearly move the crisscrossed electrodes 146A, 146B within the wire housing 162 such that the crisscrossed electrodes 146A, 146B are electrically isolated from the upper 148A, 148B and lower 150A, 150B rod contacts (see FIG. 4C)

Referring to FIG. 7C (i.e., the left side view), it can be seen that, on the second side surface 118 of the wheel 106, one or more of the second directional appendages 114 may be mounted the first radial distance 178 from the rotational center 180 from the wheel 106. Additionally, one or more of the stop appendages 120 may be mounted a second smaller radial distance 182 from the rotational center of the wheel.

Accordingly, as the wheel 106 rotates, the second directional appendages 114 push down on the second standoff 176B a sufficient distance to linearly move the crisscrossed electrodes 146A, 146B within the wire housing 162 downwards into electrical contact with the lower rod contacts 150A, 150B (see FIG. 4C). Additionally, the stop appendages 120 push the second 176B standoffs down a sufficient distance to linearly move the crisscrossed electrodes 146A, 146B within the wire housing 162 such that the crisscrossed electrodes 146A, 146B are electrically isolated from the upper 148A, 148B and lower 150A, 150B rod contacts (see FIG. 4B)

Referring to FIGS. 8A and 8A', an example is depicted of a perspective view (FIG. 8A) and an enlarged view of the circular area 8A' (FIG. 8A') of the assembled speed trigger mechanism 104 and its speed trigger rod 132 in its retracted position, according to aspects described herein. In the retracted position, the second speed appendage 124 of the programmable wheel 106 pushes down on the first speed trigger release lever 210 of the speed trigger release 198 of the speed trigger mechanism 104 to pivot the second speed trigger release lever 212 toward the programmable wheel 106. As the second speed trigger release lever 212 pivots toward the wheel 106, the tab 214 of the second speed trigger release lever 212 pushes on the side slot 204 of the speed trigger 196 of the speed trigger mechanism 104 to slide the speed trigger 196 toward the programmable wheel 106. Accordingly, the speed trigger rod 132, which is rigidly attached to the speed trigger 196, is retracted away from the microswitch 134 to release its lever arm 136 (see FIG. 8A'). thereby operating the electric motor 400 at the second speed.

Referring to FIGS. 8B and 8B', an example is depicted of a perspective view (FIG. 8B) and an enlarged view of the circular area 8B' (FIG. 8B') of the assembled speed trigger mechanism 104 and its speed trigger rod 132 in its extended position, according to aspects described herein. In the extended position, the first speed appendage 122 of the programmable wheel 106 pushes down on the inclined front surface 206 of the speed trigger 196 of the speed trigger mechanism 104 to slide the speed trigger 196 further away from the programmable wheel 106, thereby moving the speed trigger rod 132, which is rigidly attached to the speed trigger 196, into its extended position. Accordingly, the trigger rod 132 depresses the lever arm 136 of the microswitch 134 (FIG. 8B') to operate the electric motor 400 at the first speed.

Referring to FIG. 9, an example is depicted of the speed trigger mechanism 104 with speed trigger rod 132 extending through a groove 230 at a bottom of the actuator 102 to engage with the microswitch (speed control switch) 134 that controls speed of the electric motor 400, according to aspects described herein.

In order for the programmable wheel 106 to be able to mechanically control the actuator 102, speed trigger mechanism 104 and microswitch 134, it is desirable that all four components, i.e., the actuator 102, the speed control mechanism 104, the programmable wheel 106 and the microswitch 134) be arranged in close proximity to each other. One such advantageous arrangement is to have the four components all in alignment, wherein the speed trigger mechanism 104 is disposed between the programmable wheel 106 and the actuator 102, and the actuator 102 is disposed between the speed trigger mechanism 104 and the microswitch 134.

Accordingly, a groove 230 is disposed through a bottom portion of the actuator 102 to enable the speed trigger rod 132 of the speed trigger mechanism 102 to extend through the groove 230 and engage the lever arm 136 of the microswitch 134, on the opposite side of the actuator 102. The aligned arrangement of the components advantageously enables the programmable wheel 106 to mechanically control the actuator 102, speed trigger mechanism 104 and microswitch 134.

Accordingly, the motor controller 100 can electromechanically provide the control functions of stopping, rotational control and speed control to the motor 400. The motor controller 100 advantageously provides these functions without the need for software or computerized hardware, which is susceptible to being hacked.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A motor controller, comprising:
   an actuator, comprising:
      first and second conductive rods configured to receive external electric power, each rod having upper and lower rod contacts,
      first and second crisscrossed electrodes movable between, and electrically connectible to, the upper and lower rod contacts, and
      a power terminal electrically connected to the crisscrossed electrodes; and
   a programmable wheel mounted on a motorized shaft, the wheel having first and second directional appendages mounted thereon, the wheel configured to engage the actuator such that for each revolution of the wheel:
      the first directional appendage moves the crisscrossed electrodes into electrical contact with the upper rod contacts to route the electric power to the power terminal at a first polarity, the electric power at the first polarity operable to turn an electric motor electrically connected thereto in a first direction, and
      the second directional appendage moves the crisscrossed electrodes into electrical contact with the lower rod contacts to route the electrical power to the power terminal at a second opposing polarity, the electric power at the second polarity operable to turn the electrically connected electric motor in a second opposite direction.

2. The motor controller of claim 1, comprising:
   The programmable wheel having a stop appendage mounted thereon, the wheel configured to engage the actuator such that for each revolution of the wheel:
   the stop appendage moves the crisscrossed electrodes into electrical isolation from the upper and lower rod contacts to isolate the electric power from the power terminal, thereby stopping the electrically connected motor from rotating.

3. The motor controller of claim 1, wherein the actuator further comprises:
   each upper rod contact positioned on an upper portion of the first and second rods respectively;
   each lower rod contact positioned on a lower portion of the first and second rods respectively;
   the first and second crisscrossed electrodes movable between the upper and lower portions of the rods, each crisscrossed electrode having upper and lower end contacts and a power contact positioned therebetween, the power contacts of each crisscrossed electrode being electrically connected to the power terminal;
   wherein, when the crisscrossed electrodes are moved to the upper portion of the rods, the upper end contact of the first crisscrossed electrode is electrically connected to the upper rod contact of the first rod, and the upper end contact of the second crisscrossed electrode is electrically connected to the upper rod contact of the second rod to route the electric power to the power terminal at the first polarity; and
   wherein, when the crisscrossed electrodes are moved to the lower portion of the rods, the lower end contact of the second crisscrossed electrode is electrically connected to the lower rod contact of the first rod, and the lower end contact of the first crisscrossed electrode is electrically connected to the lower rod contact of the second rod to route the electric power to the power terminal at the second polarity.

4. The motor controller of claim 1, wherein the actuator further comprises:
   the first and second conductive rods being housed within a rod housing;
   the first and second crisscrossed electrodes being housed within a wire housing, the wire housing operable to move along the rod housing to electrically connect the first and second crisscrossed electrodes to the upper rod contacts of each rod or the lower rod contacts of each rod;

a transmission rack, having linear rack teeth, the transmission rack affixed to the wire housing;
a transmission gear, having circular gear teeth, the gear teeth configured to engage with the rack teeth to convert the circular movement of the transmission gear to linear movement of the transmission rack and crisscrossed electrodes within the wire housing;
a transmission gear attachment affixed to the transmission gear, the transmission gear attachment having a first and a second standoff affixed to opposing ends of the transmission gear attachment;
wherein, for each revolution of the programmable wheel:
the first directional appendage is configured to push the first standoff down a sufficient distance to linearly move the crisscrossed electrodes within the wire housing upwards into electrical contact with the upper rod contacts, and
the second directional appendage is configured to push the second standoff down a sufficient distance to linearly move the crisscrossed electrodes within the wire housing downwards into electrical contact with the lower rod contacts.

5. The motor controller of claim 4, comprising:
the first and second directional appendages configured to be mounted on first and second opposing side surfaces of the programmable wheel respectively, the directional appendages mounted a first radial distance from a rotational center of the wheel,
a stop appendage configured to be mounted on the first or the second side surfaces of the wheel, the stop appendage mounted a second radial distance from the rotational center of the wheel, the second radial distance being less than the first radial distance;
wherein, for each revolution of the programmable wheel:
the stop appendage is configured to push the first or second standoffs down a sufficient distance to linearly move the crisscrossed electrodes within the wire housing such that the crisscrossed electrodes are electrically isolated from the first and the second rod contacts, thereby electrically isolating the electric power from the power terminal and stopping the electrically connected motor from rotating.

6. The motor controller of claim 5, comprising:
the first directional appendage comprising a plurality of first directional appendages that are configured to be mounted in several locations on the first side surface of the programmable wheel;
the second directional appendage comprising a plurality of second directional appendages that are configured to be mounted in several locations on the second side surface of the programmable wheel; and
the stop appendage comprising a plurality of stop appendages that are configured to be mounted in several locations on the first and second side surfaces of the programmable wheel.

7. The motor controller of claim 5, wherein the actuator further comprises:
the transmission gear attachment comprising a lower circumferential surface having first, second and third semi-circular grooves disposed therein, the transmission gear attachment being configured to rotate with the transmission gear between a first, second and third position, wherein:
in the first position, the crisscrossed electrodes are in electrical contact with the upper rod contacts,
in the second position, the crisscrossed electrodes are electrically isolated from the upper and lower rod contacts, and
in the third position, the crisscrossed electrodes are in electrical contact with the lower rod contacts; and
a spring loaded attachment bearing disposed within an upwardly extending tube and a spring disposed within the tube urging the attachment bearing against the circumferential surface of the transmission gear attachment;
wherein, when the transmission gear attachment is in its first position, the attachment bearing is urged by the spring into the first semi-circular groove, when the transmission gear attachment is in its second position, the attachment bearing is urged by the spring into the second semi-circular groove, and when the transmission gear attachment is in its third position, the attachment bearing is urged by the spring into the third semi-circular groove.

8. The motor controller of claim 1, comprising:
a first and a second speed appendage mounted on the programmable wheel;
a speed control switch electrically connected to the electric motor, the speed control switch comprising a switching mechanism having a first switch position and a second switch position, wherein, when the switching mechanism is in the first switch position, the electric motor rotates at a first speed, and when the switching mechanism is in the second switch position, the electric motor rotates at a different second speed; and
a speed trigger mechanism, comprising a speed trigger rod configured to engage with the switching mechanism of the speed control switch, the speed trigger mechanism configured to move the speed trigger rod between an extended position and a retracted position;
wherein, for each revolution of the programmable wheel:
the first speed appendage engages the speed trigger mechanism to move the speed trigger rod into its extended position, thereby moving the switching mechanism of the speed control switch to its first switch position to operate the electric motor at the first speed, and
the second speed appendage engages the speed trigger mechanism to move the speed trigger rod into its retracted position, thereby moving the switching mechanism of the speed control switch to its second switch position to operate the electric motor at the second speed.

9. The motor controller of claim 8, comprising: the first speed appendage comprising a plurality of first speed appendages that are configured to be mounted on a plurality of locations on the programmable wheel; and the second speed appendage comprising a plurality of second speed appendages that are configured to be mounted on a plurality of locations on the programmable wheel.

10. The motor controller of claim 8, wherein the speed trigger rod extends under the actuator to engage with the switching mechanism of the speed control switch.

11. The motor controller of claim 8, comprising:
the switching mechanism of the speed control switch being a spring loaded lever arm;
wherein, when the speed trigger rod moves into its extended position, the speed trigger rod depresses the lever arm against a spring of the switching mechanism to move the lever arm into the first switch position of the switching mechanism; and wherein, when the speed trigger rod moves into its retracted position, the speed trigger rod releases the lever arm so that the spring of the switching mechanism urges the lever arm into its second switch position of the switching mechanism.

12. The motor controller of claim 8, comprising:
the programmable wheel comprising first and second opposing side surfaces with a circumferential surface extending therebetween;
the first and second speed appendages configured to be mounted on opposing first and second lateral edge portions of the circumferential surface of the wheel respectively; and
the speed trigger mechanism comprising:
  a speed trigger base,
  a speed trigger slidably disposed within the speed trigger base, a lower portion of the speed trigger being configured to fixedly attach to the speed trigger rod and slidably engage with the speed trigger base, an upper portion of the speed trigger includes an upwardly extending side slot disposed on a side surface of the upper portion and an inclined front surface of the upper portion configured to face the circumferential surface of the wheel, and
  a speed trigger release disposed within the speed trigger base adjacent the speed trigger, the speed trigger release having a center portion that is pivotally attached to the speed trigger base and a first and a second speed trigger release lever extending substantially perpendicularly relative to each other from the center portion, the first speed trigger lever configured to extend toward the circumferential surface of the wheel, the second speed trigger lever having a tab disposed on an end portion of the second speed trigger lever that extends laterally into the side slot of the speed trigger,
wherein, for each revolution of the programmable wheel:
  the first speed appendage pushes down on the inclined front surface of the speed trigger to slide the speed trigger further away from the programmable wheel, thereby moving the speed trigger rod into its extended position to operate the electric motor at the first speed, and
  the second speed appendage pushes down on the first speed trigger release lever of the speed trigger release to pivot the second speed trigger release lever toward the programmable wheel, wherein the tab of the second speed trigger release lever pushes on the side slot of the speed trigger to slide the speed trigger toward the programmable wheel, thereby moving the speed trigger rod into its retracted position to operate the electric motor at the second speed.

13. The motor controller of claim 12, wherein the speed trigger mechanism further comprises:
a semi-circular groove disposed in a side surface of the speed trigger;
a trigger bearing and trigger bearing loading spring disposed within a horizontally extending tube, the spring urging the trigger bearing against a side surface of the speed trigger;
wherein, when the speed trigger rod is in its extended position, the trigger bearing is urged into the semi-circular groove by the spring.

14. A motor controller, comprising:
a programmable wheel mounted on a motorized shaft, the wheel having first and second speed appendages mounted thereon;
a speed control switch electrically connected to an electric motor, the speed control switch comprising a switching mechanism having a first switch position and a second switch position, wherein, when the switching mechanism is in the first switch position, the electric motor rotates at a first speed, and when the switching mechanism is in the second switch position, the electric motor rotates at a different second speed; and
a speed trigger mechanism, comprising a speed trigger rod configured to engage with the switching mechanism of the speed control switch, the speed trigger mechanism configured to move the speed trigger rod between an extended position and a retracted position;
wherein, for each revolution of the programmable wheel:
  the first speed appendage engages the speed trigger mechanism to move the speed trigger rod into its extended position, thereby moving the switching mechanism of the speed control switch to its first switch position to operate the electric motor at the first speed, and
  the second speed appendage engages the speed trigger mechanism to move the speed trigger rod into its retracted position, thereby moving the switching mechanism of the speed control switch to its second switch position to operate the electric motor at the second speed.

15. The motor controller of claim 14, comprising: the first speed appendage comprising a plurality of first speed appendages that are configured to be mounted on a plurality of locations on the programmable wheel; and
the second speed appendage comprising a plurality of second speed appendages that are configured to be mounted on a plurality of locations on the programmable wheel.

16. The motor controller of claim 14, comprising:
the switching mechanism of the speed control switch being a spring loaded lever arm;
wherein, when the speed trigger rod moves into its extended position, the speed trigger rod depresses the lever arm against a spring of the speed control switch to move the lever arm into the first switch position of the switching mechanism; and
wherein, when the speed trigger rod moves into its retracted position, the speed trigger rod releases the lever arm so that the spring urges the lever arm into its second switch position of the switching mechanism.

17. The motor controller of claim 14, comprising:
the programmable wheel comprising first and second opposing side surfaces with a circumferential surface extending therebetween;
the first and second speed appendages configured to be mounted on opposing first and second lateral edge portions of the circumferential surface of the wheel respectively; and
the speed trigger mechanism comprising:
  a speed trigger base,
  a speed trigger slidably disposed within the speed trigger base, a lower portion of the speed trigger being configured to fixedly attach to the speed trigger rod and slidably engage with the speed trigger base, an upper portion of the speed trigger includes an upwardly extending side slot disposed on a side surface of the upper portion and an inclined front surface of the upper portion configured to face the circumferential surface of the wheel, and
  a speed trigger release disposed within the speed trigger base adjacent the speed trigger, the speed trigger release having a center portion that is pivotally attached to the speed trigger base and a first and a second lever extending substantially perpendicularly relative to each other from the center portion, the first lever configured to extend toward the circumferential surface of the wheel, the second lever having a tab disposed on an end portion of the second lever that extends laterally into the side slot of the speed trigger, wherein, for each revolution of the programmable wheel:
the first speed appendage pushes down on the inclined surface of the speed trigger to slide the speed trigger further away from the programmable wheel, thereby moving the speed trigger rod into its extended position to operate the electric motor at the first speed, and the second speed appendage pushes down on the first lever of the speed trigger release to pivot the second lever toward the programmable wheel, wherein the tab of the second lever pushes on the side slot of the speed trigger to slide the speed trigger toward the programmable wheel, thereby moving the speed trigger rod into its retracted position to operate the electric motor at the second speed.

18. The motor controller of claim 17, wherein the speed trigger mechanism further comprises:
a semi-circular groove disposed in a side surface of the lower portion of the speed trigger;
a spring loaded trigger bearing disposed within a vertically extending tube, the spring urging the trigger bearing against the side surface of the lower portion of the speed trigger;
wherein, when the speed trigger rod is in its extended position, the trigger bearing fits into the semi-circular groove.

19. The motor controller of claim 14, further comprising: an actuator, comprising:
first and second conductive rods configured to receive external electric power, each rod having upper and lower rod contacts,
first and second crisscrossed electrodes movable between, and electrically connectible to, the upper and lower rod contacts, and
a power terminal electrically connected to the crisscrossed electrodes; and
the programmable wheel having first and second directional appendages and a stop appendage mounted thereon, the wheel configured to engage the actuator such that for each revolution of the wheel:
the first directional appendage moves the crisscrossed electrodes into electrical contact with the upper rod contacts to route the electric power to the power terminal at a first polarity, the electric power at the first polarity operable to turn an electric motor electrically connected thereto in a first direction,
the second directional appendage moves the crisscrossed electrodes into electrical contact with the lower rod contacts to route the electrical power to the power terminal at a second opposing polarity, the electric power at the second polarity operable to turn the electrically connected electric motor in a second opposite direction, and
the stop appendage moves the crisscrossed electrodes into electrical isolation from the upper and lower rod contacts to isolate the electric power from the power terminal, thereby stopping the electrically connected motor from rotating.

20. The motor controller of claim 19, wherein the actuator further comprises:
the first and second conductive rods being housed within a rod housing;
the first and second crisscrossed electrodes being housed within a wire housing, the wire housing operable to move along the rod housing to electrically connect the first and second crisscrossed electrodes to the upper rod contacts of each rod or the lower rod contacts of each rod;
a transmission rack, having linear rack teeth, the transmission rack affixed to the wire housing;
a transmission gear, having circular gear teeth, the gear teeth configured to engage with the rack teeth to convert the circular movement of the transmission gear to linear movement of the transmission rack and crisscrossed electrodes within the wire housing;
a transmission gear attachment affixed to the transmission gear, the transmission gear attachment having a first and a second standoff affixed to opposing ends of the transmission gear attachment;
the first and second directional appendages configured to be mounted on first and second opposing side surfaces of the programmable wheel respectively, the directional appendages mounted a first radial distance from a rotational center of the wheel,
the stop appendage configured to be mounted on the first or the second side surfaces of the wheel, the stop appendage mounted a second radial distance from the rotational center of the wheel, the second radial distance being less than the first radial distance;
wherein, for each revolution of the programmable wheel:
the first directional appendage is configured to push the first standoff down a sufficient distance to linearly move the crisscrossed electrodes within the wire housing upwards into electrical contact with the upper rod contacts,
the second directional appendage is configured to push the second standoff down a sufficient distance to linearly move the crisscrossed electrodes within the wire housing downwards into electrical contact with the lower rod contacts, and
the stop appendage is configured to push the first or second standoffs down a sufficient distance to linearly move the crisscrossed electrodes within the wire housing such that the crisscrossed electrodes are electrically isolated from the first and the second rod contacts, thereby electrically isolating the electric power from the power terminal and stopping the electrically connected motor from rotating.

* * * * *